Nov. 23, 1937.    D. B. WINTER    2,099,918
COVER FOR CONDUIT OUTLET BOXES
Filed June 10, 1936
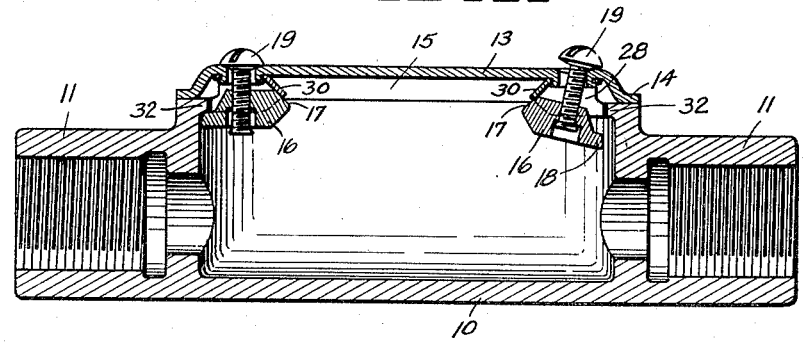
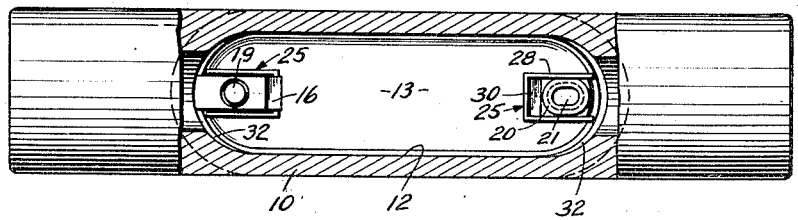
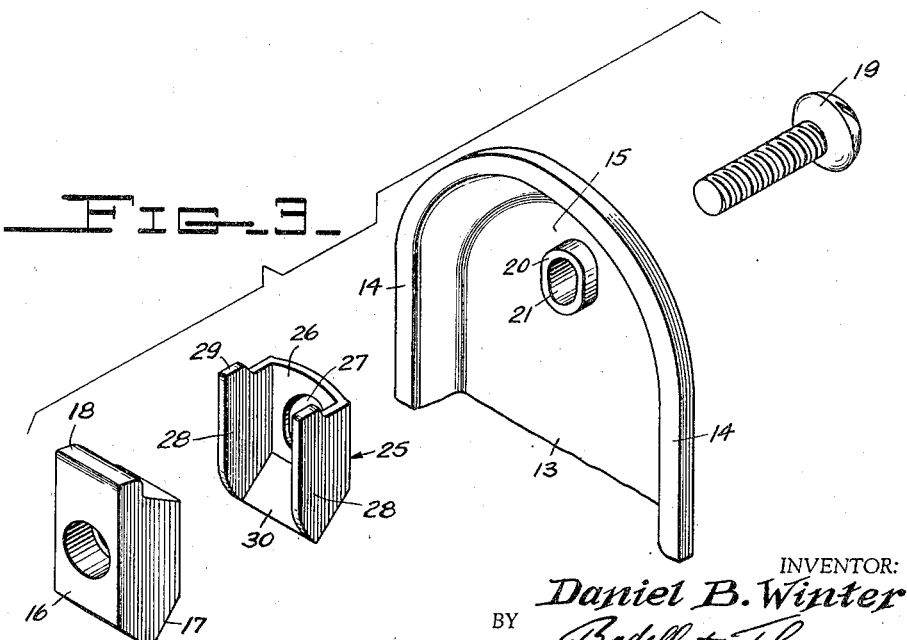
INVENTOR:
Daniel B. Winter,
BY Bodell & Thompson
ATTORNEYS.

Patented Nov. 23, 1937

2,099,918

UNITED STATES PATENT OFFICE 2,099,918

COVER FOR CONDUIT OUTLET BOXES

Daniel B. Winter, Syracuse, N. Y., assignor to Crouse-Hinds Company, Syracuse, N. Y., a corporation of New York Application June 10, 1936, Serial No. 84,493

2 Claims. (Cl. 247—15)

This invention relates to covers for electrical conduit outlet boxes of the type set forth in Patent No. 1,767,226, issued June 24, 1930, and has for its object a particularly simple, light and strong construction of a cover and assembly of the wedging member or nut of the self contained fastening means for the cover, and which construction is particularly economical in manufacture.

The invention consists in the novel features and in the combinations and constructions hereinafter set forth and claimed.

In describing this invention, reference is had to the accompanying drawing in which like characters designate corresponding parts in all the views.

Figure 1 is a lengthwise, sectional view of a conduit outlet box and the removable cover embodying the invention.

Figure 2 is a bottom, plan view of the article shown in Figure 1, with the central portion of the outlet box in section.

Figure 3 is an exploded view of the cover fastening means including a portion of the cover.

The conduit outlet box comprises a body 10 provided with internally threaded housings 11 to receive the ends of the conduit. The particular outlet box illustrated is comparatively shallow and is provided with an opening 12 in one side thereof to permit manipulation of the electrical wiring in the conduit system. The opening 12 is usually oblong, or elongated, and of comparatively narrow width.

As here illustrated, the cover 13 is formed of comparatively heavy sheet material and is provided with a marginal flange 14 for resting on the edge of the wall of the box around the opening 12. The cover is slightly drawn to provide a central depression or recess 15 on its inner side within the marginal flange 14 and conforming to the same.

The cover 13 is detachably secured to the open side of the box, and in the type disclosed the cover is provided with self contained fastening means which is operable from the outside of the cover to engage the end walls of the opening 12. This invention has to do particularly with the construction of this fastening means.

The fastening means comprises a nut 16 formed with a beveled end face 17 at one end and a projection 18 at the opposite end, the projection 18 being of less thickness than the body of the nut. The body of the nut is formed with a threaded aperture to receive shanks of the screw 19 which extend through the cover from the outside thereof.

The cover 13 is provided, adjacent the marginal flange 14, with an inwardly extending projection 20. This projection 20 is obround in general shape, and is provided with an elongated aperture 21 extending through the cover to receive the screws 19. The covers 13 are usually formed of sheet material, and in that instance the projection 20 is formed, or drawn, at the same time the aperture 21 is punched in the cover.

The structure of the fastening means further includes a channel shaped member designated generally 25, the bottom wall 26 of which is provided with an elongated aperture 27 to receive the projection 20 on the under side of the cover. The side walls 28 extend substantially parallel with the long axis of the aperture 27. The outer ends of the sides 28 are provided with short extensions 29, the purpose of which will be hereinafter referred to, and the inner ends of the sides 28 are connected by a beveled wall 30. The end wall 30 slants downwardly and toward the apertures 27, 21, and is complemental to the beveled end face 17 on the nut 16. It will be apparent that as the screw 19 is threaded into the nut 16, and the nut moved axially on the screw toward the cover, the nut will be moved lengthwise of the channel member, because of the engagement of the beveled end face 17 of the nut with the beveled end wall 30 of the channel member.

The projection 20 serves to locate the channel member 25 and further serves as a convenient and economical means of securing the member to the cover. In the illustrated embodiment of the invention, a projection 20 is arranged adjacent the flange 14 at each end of the cover 13. The projections 20, in this instance, are arranged with their major axis extending substantially radially relatively to the curved end portion of the cover 13. The projections 20 may be arranged along the side edges of the cover, in which instance the major axis of the projections will extend at right angles to the side portions of the flange 14. That is, the sides 28 of the channel member extend toward the marginal face of the cover. The channel members 17 are secured to the under side of the cover by swaging the end or edge of the projection 20 over the bottom 26 about the aperture 27, as shown in Figures 1 and 2. Due to the fact that the projections 20 are obround, and the apertures 27 are formed complemental therewith, the channel members 25 are secured to the under side of the cover in a predetermined position, and are held from movement relative to the cover. Obviously, the bottom 26 of the channel may be provided with the projection, and the cover with a complemental aperture.

The location of the apertures 21 and projections 20, and the relative dimensions of the channel member 25 are such that the projections 29 on the sides of the channel member form abutments to locate the cover 13 centrally of the opening 12 in the box, and the projection 18 on the outer end of the nut 17 engages the end wall of the opening 12 and the under side of a ledge 32 in said end wall when the screw 19 is tightened.

When the cover is applied to the box, the screws 19 are threaded outwardly, and the nuts 16 assume the position shown to the right in Figure 1. When the screws 19 are threaded into the nuts, and the nuts drawn toward the under side of the cover, they are moved outwardly toward the flange 14 until the projections 18 engage the wall of the box beneath the ledge 32.

Heretofore, the cam member for effecting wedging action of the nut has been formed of various constructions generally employing a separate sheet metal plate attached to the under side of the cover by welding, or otherwise. Such construction resulted in an expensive cover because of the amount of material involved, and the amount of labor consumed in assembling the cover.

It will be apparent, from the above description, that I have provided a very simple and efficient construction for effecting a wedging action of the fastening nuts. As previously stated, the covers are usually formed of sheet metal, and when so formed, the projection 20 is formed simultaneously with the formation of the aperture 21 in the cover. The channel member 25 may be formed of suitable sheet metal in a single operation, and by the novel arrangement and construction set forth, the channel member 25 is readily secured to the cover in a predetermined position to effect most efficient operation without the necessity of any adjustment by the workman assembling the cover. Also, because of the channel formation, the nuts 17 are maintained in a correct position at all times relative to the cover, and the channel member 25, while of simple and light construction, is exceptionally strong and durable, permitting the screws 19 to be tightened to the extent necessary to properly clamp a gasket between the flange 14 of the cover and the marginal edge of the box about the opening 12.

What I claim is:

1. The combination of a conduit outlet box having an opening in one side, of a cover for the open side having a marginal bearing face overlying the edge wall around the opening, a channel member arranged on the under side of the cover adjacent said marginal face with the sides of the channel extending toward said marginal face, said channel and cover being provided with a complemental projection and aperture, with the projection extending through the aperture and being swedged over to secure the channel to the cover, a nut arranged in the channel member, a screw extending through the cover from the outside thereof and threading in the nut, the nut and channel member having coacting surfaces to effect movement of the nut toward the marginal edge of the cover and into engagement with the side wall of the box when the screw is threaded into the nut.

2. The combination of a conduit outlet box having an opening in one side, of a cover for the open side having a marginal bearing face overlying the edge wall around the opening, said cover being formed with an inwardly extending tubular projection of elliptical formation, a channel member arranged on the under side of the cover adjacent said marginal face with the sides of the channel extending toward said marginal face, said channel member being formed with an aperture in the bottom wall thereof of form complemental to said projection, with the projection extending through said aperture and being swedged over to secure the channel member to the cover, a nut arranged in the channel member, a screw extending through said tubular projection from the outside of the cover and threading into said nut, said nut and channel member having coacting surfaces to effect movement of the nut toward the marginal edge of the cover and into engagement with the side wall of the box when the screw is threaded into the nut.

DANIEL B. WINTER.